(12) United States Patent
Veltman

(10) Patent No.: US 6,864,660 B2
(45) Date of Patent: Mar. 8, 2005

(54) METHOD AND DEVICE FOR CONTROLLING AN ELECTRIC LOAD CONNECTED TO A MULTIPHASE SWITCHABLE DC/AC FREQUENCY CONVERTOR

(75) Inventor: Andre Veltman, Culemborg (NL)

(73) Assignee: GTI Electroproject B.V., Zaadam (NL)

( * ) Notice: Subject to any disclaimer, the term of this patent is extended or adjusted under 35 U.S.C. 154(b) by 29 days.

(21) Appl. No.: 10/437,274

(22) Filed: May 13, 2003

(65) Prior Publication Data

US 2004/0080967 A1 Apr. 29, 2004

(30) Foreign Application Priority Data

May 15, 2002 (NL) .............................................. 1020601

(51) Int. Cl.[7] .......................... H02M 3/00; H02M 5/00; H02P 7/42
(52) U.S. Cl. .......................... 318/801; 318/808; 363/36; 363/40
(58) Field of Search ................................ 318/798–812, 318/701, 716, 720; 363/34–37, 40, 41, 95, 98, 120, 131, 132

(56) References Cited

U.S. PATENT DOCUMENTS

| | | | | |
|---|---|---|---|---|
| 3,644,820 A | * | 2/1972 | Ainsworth | 363/149 |
| 4,484,128 A | * | 11/1984 | Jotten et al. | 318/805 |
| 5,585,709 A | * | 12/1996 | Jansen et al. | 318/807 |
| 5,959,430 A | * | 9/1999 | Yuki et al. | 318/805 |
| 6,005,783 A | * | 12/1999 | Xue et al. | 363/36 |
| 6,326,762 B1 | * | 12/2001 | Jiang et al. | 318/811 |
| 6,462,974 B1 | * | 10/2002 | Jadric | 363/127 |
| 6,653,812 B1 | * | 11/2003 | Huo et al. | 318/801 |

* cited by examiner

Primary Examiner—David Martin
Assistant Examiner—Eduardo Colon Santana
(74) Attorney, Agent, or Firm—Porter, Wright, Morris & Arthur, LLP

(57) ABSTRACT

A method and a device for realizing an effective value of a quantity to be varied in an electrical load connected to a multi-phase switchable DC/AC frequency convertor comprising a plurality of controllable switches. The value is realized by varying a current or a voltage delivered by the DC/AC frequency convertor through suitable switching of the switches thereof, and wherein the quantity exhibits a load angle which, averaged in time, leads or lags the voltage or current being delivered. The method and/or the device is arranged for carrying out the steps comprising the defining of a dead zone having dimensions that are representative of an allowable amplitude and phase angle deviation in the quantity to be realized; the orienting of the dead zone with respect to the voltage or current delivered by the DC/AC frequency convertor by rotating the dead zone through the load angle in the direction of the delivered voltage or current; and the switching of one or more of the switches on the basis of the manner in which the deviation in the quantity to be realized extends beyond the dead zone, for the purpose of realizing the quantity during operation with an amplitude and phase deviation ranging within the dead zone.

21 Claims, 3 Drawing Sheets

METHOD AND DEVICE FOR CONTROLLING AN ELECTRIC LOAD CONNECTED TO A MULTIPHASE SWITCHABLE DC/AC FREQUENCY CONVERTOR

BACKGROUND OF THE INVENTION

1. Field of the Invention

The invention relates to a method for realizing an effective value of a quantity to be varied in an electrical load connected to a multi-phase switchable DC/AC frequency convertor comprising a plurality of controllable switches.

2. Description of Related Art

An electrical load within the context of the present invention is e.g. a controllable electrical drive unit consisting of a multi-phase (usually three-phase) electric motor, whose windings are connected to the frequency convertor. The frequency convertor is fed with direct current, which direct current is converted into a controllable alternating current by suitably turning the switches of the frequency convertor on and off. Consequently, the frequency convertor converts a direct current voltage (DC) into an alternating current voltage (AC) having an adjustable amplitude and frequency. In English professional literature, such frequency convertors are also indicated by the term "invertor".

In practice three main groups of frequency convertors can be distinguished, the so-called voltage source convertors, indicated by the acronym VSI ("Voltage Source Invertor") in English professional literature, current source convertors, indicated by the acronym CSI ("Current Source Invertor") in English professional literature, and the so-called matrix convertors. In practice, VSI's are used by far the most.

Other examples of electrical loads within the context of the present invention are e.g. transformers, power resistors and the like, for alternating current such loads have a "high-frequency impedance" sufficiently higher than zero for control by a VSI, or a "high-frequency impedance" sufficiently close to zero for control by a CSI.

In its simplest form, a three-phase VSI consists of six unidirectional controllable switches, usually IBGT- or GTO-type semiconductor switches, and one or more capacitors as a DC interstage circuit buffer. In its simplest form, a three-phase CSI likewise comprises six unidirectional controllable switches, but on the other hand it comprises an induction coil as the DC interstage circuit buffer. A matrix convertor does not comprise an interstage circuit, but in its simplest three-phase form it comprises nine bidirectional controllable switches.

The advantage of the VSI is that it can be fed from a passive rectifier, whereas a CSI needs an invertor as the connection to the power-supplying electricity grid.

A CSI by definition behaves like a current source at its output terminals, whereas the VSI behaves like a voltage source and the matrix convertor exhibits the input impedance.

Because of its practical simplicity, a VSI is generally used in practice, for example for realizing a desired motor current in an electric motor, which VSI is controlled in such a manner that the desired motor current will flow in the electric motor. In order to enable proper adjustment of the force or the torque of the electric motor that is being generated, quick and accurate adjustments of the current through the motor must be possible. When a VSI is used, the voltage delivered by the VSI will have to be varied. The use of a desired voltage value related to the motor current to be realized has a delaying effect on the speed at which the motor current can be adjusted, however.

In practice, the dynamics of a current-controlled VSI strongly depend on the parameters and the working point of the connected electric motor. That is, in those cases in which the motor parameters are subject to change, or in the case of strongly varying loads, a current-controlled VSI functions anything but optimally. An example of this is a large linear electric motor whose stator is switched in portions, so that the inductivity will change in steps.

BRIEF SUMMARY OF THE INVENTION

Consequently it is an object of the invention in its most general form to provide a new method for realizing an effective value of a quantity to be varied in an electrical load connected to a multi-phase switchable DC/AC frequency convertor, by means of which the value of the quantity to be varied can be realized more optimally and in a much shorter period of time in comparison with methods that are known per se in practice, which methods are based on the assumption that parameters are constant.

This objective is achieved with the method according to the invention by varying a current or a voltage delivered by the DC/AC frequency convertor through suitable switching of the switches thereof, in which the quantity exhibits a load angle which, averaged in time, leads or lags the voltage or current being delivered, which method furthermore comprises the steps of:

defining a dead zone having dimensions representative of an allowable amplitude and phase angle deviation in the quantity to be realized;

orienting the dead zone with respect to the voltage or current delivered by the DC/AC frequency convertor by rotating the dead zone through the load angle in the direction of the delivered voltage or current; and switching one or more of the switches on the basis of the manner in which the deviation in the quantity to be realized extends beyond the dead zone, for the purpose of realizing the quantity during operation with an amplitude and phase angle deviation ranging within the dead zone.

The method according to the invention is based on the recognition that, by defining a dead zone which is indicative of the allowable amplitude and phase angle deviations in the quantity to be realized and by suitably orienting the dead zone with respect to the voltage or current delivered by the frequency convertor, information for the switching of one or more of the switches of the frequency convertor can be obtained from the manner in which the deviation in the realized quantity extends beyond the dead zone, in such a manner that the deviation in the quantity will be reduced to a value within the range of allowable amplitude and phase angle deviations again.

That is, from the manner in which the deviation (i.e. the current value of the quantity minus the value to be realized) extends beyond the dead zone it can be derived which switches of the frequency convertor are to be switched in order to effect a phase and/or amplitude correction in the quantity in question, so that this quantity will reach the desired value to be realized again. Switching errors can be avoided as much as possible by suitably orienting the dead zone.

In a preferred embodiment of the method according to the invention, the dead zone is quadrangular in shape, preferably square, having opposing first and second boundary lines and opposing third and fourth boundary lines. In that case, information that is needed for suitably controlling the switches can be derived from the fact that a respective boundary line of the dead zone is being crossed.

The number of switching moments of the frequency convertor for effecting the desired value of the quantity to be varied can be minimized by adopting suitable switching rules.

The dimensions of the dead zone are selected in dependence on the allowable amplitude and/or phase angle deviation with which the quantity to be varied may be realized. This may vary from application to application, of course. A larger dead zone will lead to fewer switching actions than a relatively smaller switching area or dead zone.

If desired, the dimensions of the dead zone can be separately set in various directions. In the case of a rectangle, the height and the width can be adjusted. In practice it has been found, however, that a quadrangle, preferably a square, enables a robust and quick control of the quantity to be varied without the need for complicated and comprehensive control programs for switching the frequency convertor.

For an efficient control it is important that the orientation of the dead zone is closely related to the voltage or current realized by the frequency convertor, i.e. the direction in which the vector representation thereof is moving. In the case of an electric motor, for example, the motor current will be reversed upon active braking of the motor. In such a case, the orientation of the dead zone will have to be rotated 180°. That is, all this in such a manner that the switching rules also apply to such a braking electric motor.

In a preferred embodiment of the method according to the invention, in which the dead zone is quadrangular in shape, the dead zone is oriented in such a manner with respect to the voltage or current delivered by the frequency convertor that when the deviation in the quantity to be realized crosses the opposing first and second boundary lines from within the dead zone, the switches of the frequency convertor will be switched in such a manner that the phase angle of the voltage or current being delivered will be increased or decreased, as the case may be, and that when the deviation in the quantity to be realized crosses the opposing third and fourth boundary lines from within the dead zone, the switches of the frequency convertor will be switched in such a manner that the amplitude of the voltage or current being delivered will be increased or decreased, as the case may be.

A problem as regards the controlling of a quantity to be varied will occur if the quantity in question has relatively small amplitude values, so that the effective amplitude of the voltage or current being delivered by the frequency convertor has relatively small values, in the order of the dimensions of the switching range. More in particular, relatively small values of the voltage being delivered in the case of control by means of a VSI, and relatively small values of the current being delivered in the case of control by means of a CSI.

In order to effect an adequate control of the quantity to be varied for said small values as well, the method according to the invention, in a further embodiment thereof, arranges for the dead zone to be periodically rotated through 180° in alternate directions in the case of such a relatively small amplitude of the effective value of the voltage or current being delivered by the frequency convertor.

The method according to the invention can also be used with multi-phase switchable DC/AC frequency convertors having several control levels (called "multi-level invertors" in English professional literature).

In yet another embodiment of the method according to the invention, the switches of the frequency convertor are switched in steps for each level in the case of a multi-phase switchable DC/AC frequency convertor having several control levels, for the purpose of realizing the quantity in question with an amplitude and phase deviation that ranges within the dead zone.

An important advantage of the method according to the invention is furthermore the possibility of optimizing the quantity to be varied when the output of the frequency convertor reaches the limits thereof.

According to another embodiment of the method according to the invention, separate control of the phase angle of the quantity to be realized makes it possible in the case of small or undersized systems to control up to about 20% more power than is possible with the prior art methods.

The invention also relates to a multi-phase switchable DC/AC frequency convertor for controlling a quantity to be varied in an electrical load in accordance with one or more of the embodiments of the method according to the invention as set forth above.

The invention also relates to a control program, such as a computer program stored on a data carrier to be read by digital processor means or other programmable processing means, such as a CD-ROM, a floppy disk, a hard disk or the like, and arranged for carrying out the method as described above when loaded into the working memory of the processor means or processing means.

The present invention also relates to a data carrier comprising such a control program.

The device according to the invention can also be realized in whole or in part with analog components, in particular so-called "Field-Programmable Analog Arrays" (FPGAs) may be considered.

It should be understood that the method and the frequency convertor according to the invention are suitable for controlling any quantity to be varied of an electrical load, such as the flux, the current, the voltage, etcetera of an electric motor.

The frequency convertor according to the invention operates in a simple and robust manner and has a number of very advantageous features, in particular the rapid manner in which a desired value of a quantity to be realized is achieved with fewer switching moments of the frequency convertor in comparison with usual convertors. Since the frequency convertor according to the invention works a-synchronously and switches only when this is necessary, the average switching frequency is significantly lower than in the case of usual frequency convertors, which in practice leads to the absence of an objectionable acoustic sound, such as the objectionable squeaking and whistling of usual convertors. The frequency convertor according to the invention, on the other hand, produces a non-objectionable "noise".

Using the frequency convertor according to the invention, it is possible to realize the highest possible driving force, inter alia when controlling electric motors, without there being a need to know the parameters of the electric motor. In particular in the case of linear motors, in which the dominant inductivity changes very rapidly and frequently, the gain will be enormous.

The invention will be explained in more detail hereinafter on the basis of the use thereof for controlling the current of a linear electric motor by means of a so-called VSI frequency convertor. The invention is not limited to the use of a VSI, however, it can also be used with a CSI or with a matrix convertor, and with electrical loads other than a linear electric motor, as has been explained in the foregoing.

DESCRIPTION OF THE SEVERAL VIEWS OF THE DRAWING(S)

In the drawing:

FIG. 1 is a concise schematic diagram of a VSI, with an electric motor connected thereto.

FIG. 2 schematically and graphically shows switching vectors of the VSI of FIG. 1.

Figure 4:
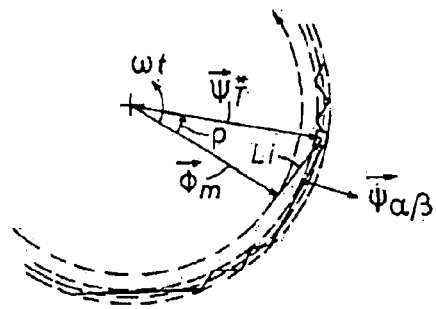
FIG. 4 is a schematic representation of the stator flux of the electric motor that is connected to the VSI of FIG. 1.
Figure 5:
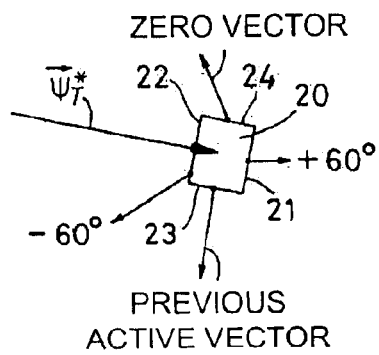

FIG. 5 schematically shows a so-called dead zone, which represents an allowable amplitude and phase angle deviation in the stator flux as shown in FIG. 4.

Figure 1:
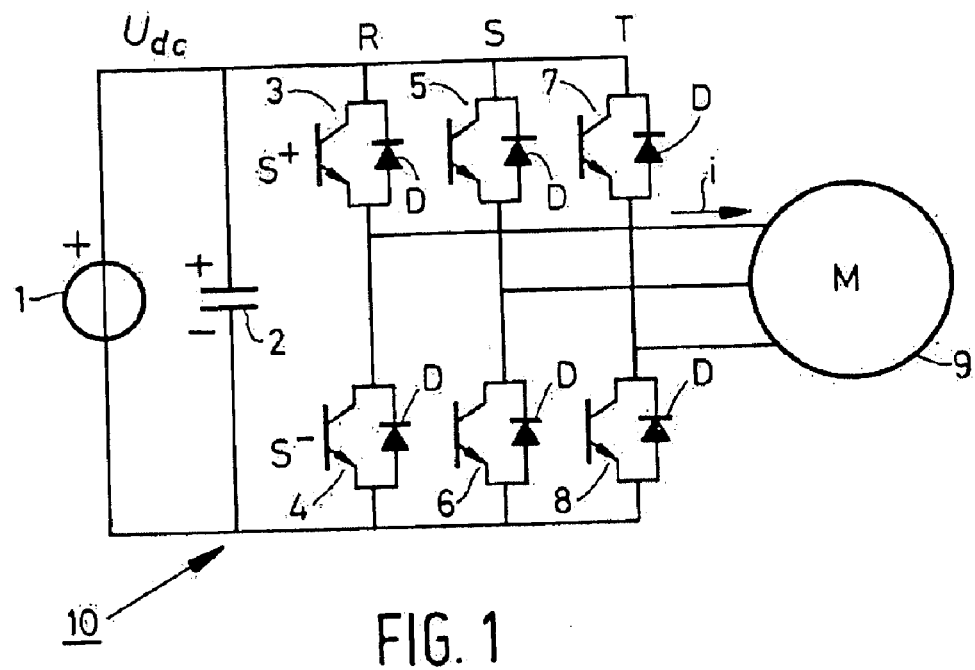
Figure 3:
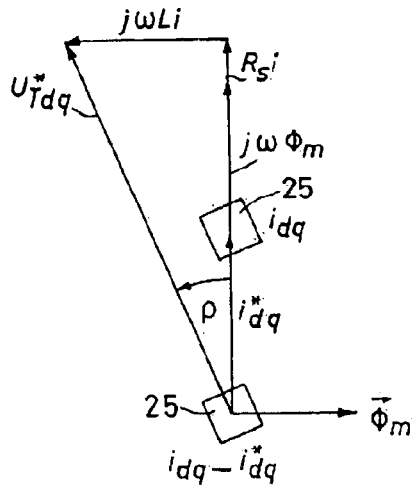
FIG. 3 shows a vector representation of the voltage to be delivered by the VSI of FIG. 1 for the purpose of realizing a desired motor current.
Figure 6:
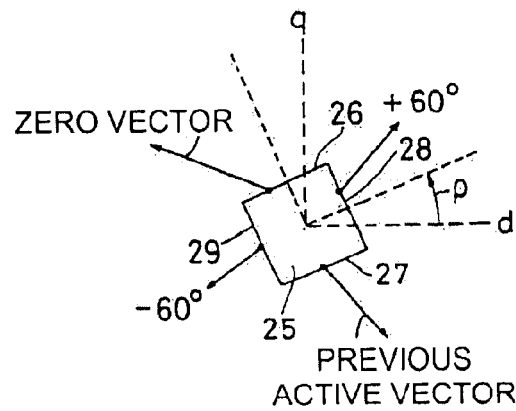

FIG. 6 schematically shows the dead zone and the switching rules as shown in FIG. 3, being transformed to the motor current to be realized in the circuit according to FIG. 1 and being oriented in accordance with the invention.

Figure 7:
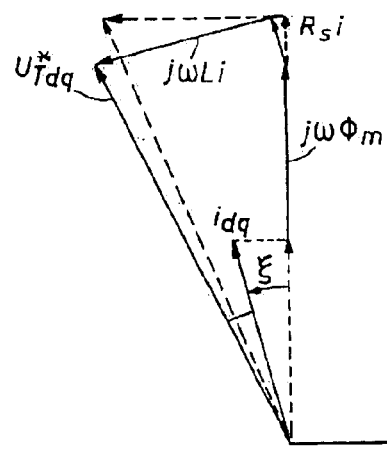

FIG. 7 shows a vector representation of an additional phase shift according to the invention of the motor current for reducing the required voltage of the VSI in the circuit of FIG. 1.

Figure 8:
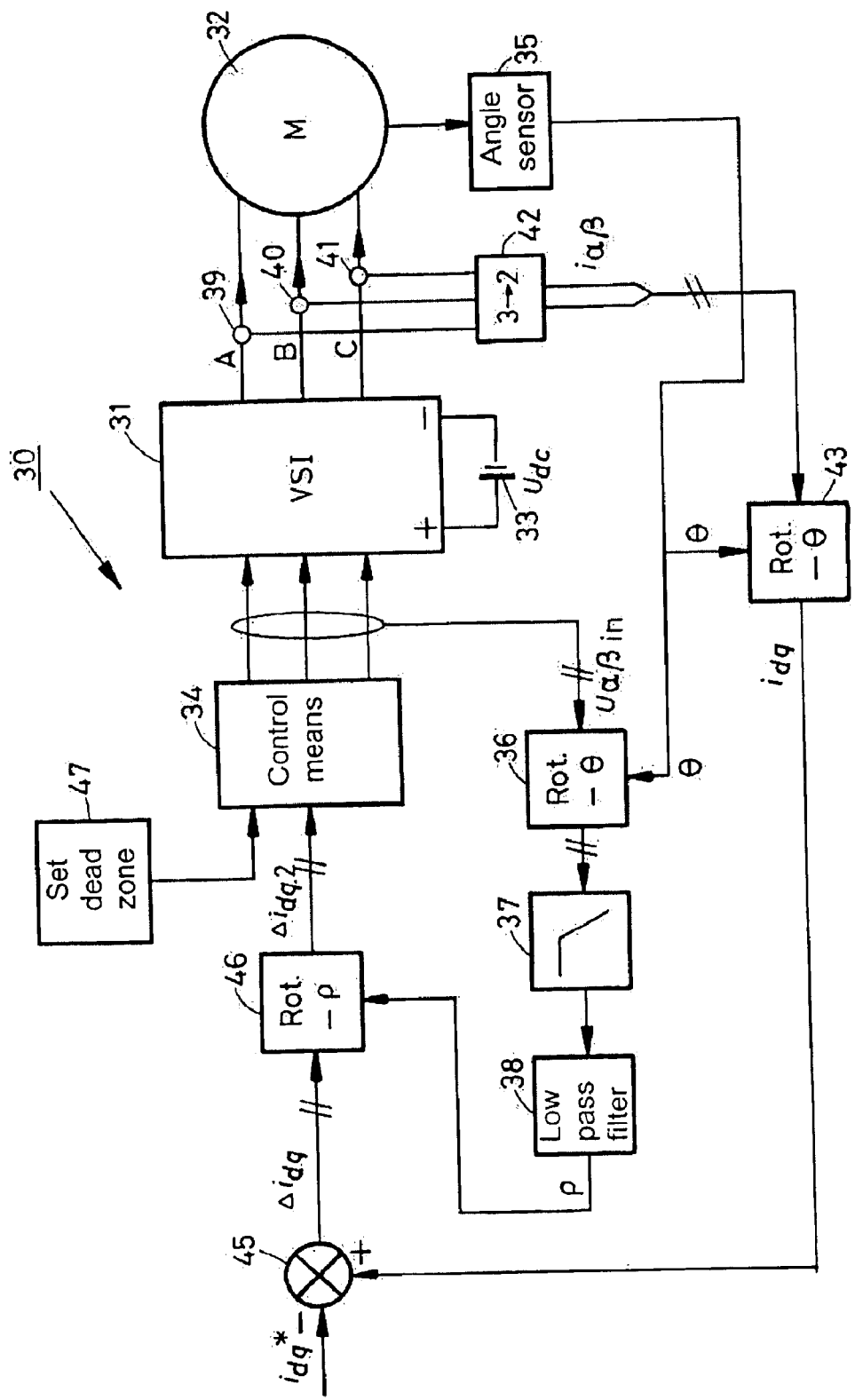

FIG. 8 is a simplified block diagram of an embodiment of a device according to the invention.

DETAILED DESCRIPTION OF THE INVENTION

As is schematically shown in FIG. 1, a VSI 10 roughly consists of a DC source, to which two switches $S^+$ and $S^-$ connect in series for each of the phases RST of the output voltage to be realized, these switches being indicated by the numerals 3, 5, 7, respectively, for the $S^+$ switches and 4, 6, 8, respectively, for the $S^-$ switches.

An electrical load in the form of a three-phase AC motor 9 is connected to the centers between the respective switches 3, 4; 5, 6 and 7, 8. The switches 3–8 are connected to a DC power supply source 1, to the output terminals of which one or more capacitors 2 are connected as an interstage circuit. Only one capacitor 2 is shown by way of example in the Figure.

The switches 3–8 are IGBT- or GTO-type semiconductor switches, for example, and a diode D is connected in anti-parallel across the conducting path of each of the semiconductor switches.

Three states can be distinguished for each of the phases R, S and T:

state 1: the switch $S^+$ is on (conducting) and the switch $S^-$ is off (non-conducting): the output voltage at the connected AC motor 9 is equal to the positive DC voltage, irrespective of the direction of the current.

state 0: the switch $S^+$ is off and the switch $S^-$ is on: the output voltage at the DC motor is equal to the DC direct voltage, irrespective of the direction of the current.

state H: both switches $S^+$ and $S^-$ are off: the phase is passive, i.e. the anti-parallel diodes D can carry current if current is being supplied by the load, in other situations the output of the frequency convertor numeral 10 is a high-impedance output.

A fourth state, in which the two switches $S^+$ and $S^-$ of a phase are on, is not allowed, because a short-circuit will occur in the DC connection in that case. When switching from 1→H→0 or from 0→H→1, it is important that this takes place via the state H at all times. The period of time this takes is called "dead time", in practice it lasts a few μs.

In the case of a three-phase VSI, there are in principle $3^3$=27 switching possibilities, but usually the state H is left out of consideration, so that only $2^3$=8 possibilities remain in practice. That is, the six active vectors RST=100, 110, 010, 011, 001, 101 and the two zero vectors 000 and 111. The on-state of a switch is indicated by the numeral 1 and the off-state is indicated by the numeral 0.

Figure 2:
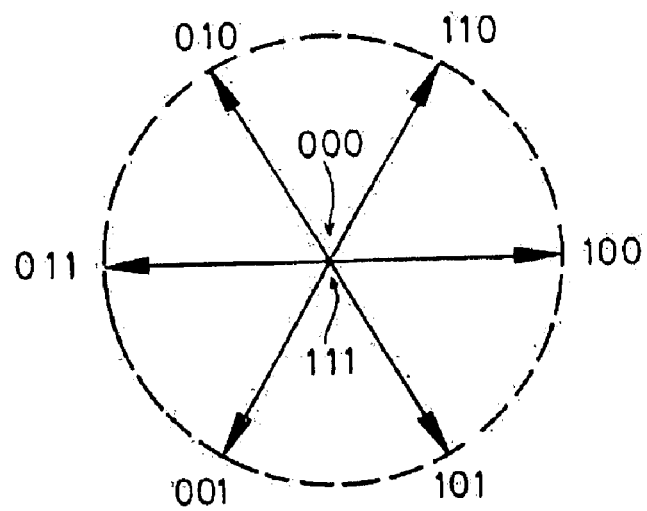

The switching vectors are schematically shown in FIG. 2 and in Table 1. The designations that are used refer to the vectorial addition of the voltage on the three phases R, S and T, which, as usual, are phase-shifted through 120° relative to each other.

As is shown in FIG. 2, the six active vectors are spaced exactly 60° apart, and the zero vectors are positioned in the origin.

In the stationary or fixed domain (α, β), the resulting voltage vector $\vec{u}_{inv}$ at the output of the frequency convertor 10, or on the output terminals of the motor 9, can be written $\vec{u}_{inv}=(u_\alpha, u_\beta)^T$. The current in the three phases can be written as a vector, too.

Hereinafter, a rotary coordinate system (d, q) synchronous with the motor flux will be used for describing the method according to the invention.

As is schematically shown in FIG. 3, it is possible to determine vectorially, starting from a desired load current $i^*_{dq}$ of the motor, which desired terminal voltage $u^*_{Tdq}$ associated therewith is required at the connection terminals of the motor 9 in order to realize this current.

As is known, a motor can be represented in its simplest form by a resistor Rs and an inductor L connected in series with the internal emk $u_m$ generated by the motor and connected to the terminal voltage $u^*_{Tdq}$.

TABLE 1

| | | | | | | | | |
|---|---|---|---|---|---|---|---|---|
| | | | Switching states | | | | | |
| active state | RST | zero vector | $U_R$ | $U_S$ | $U_T$ | $U_\alpha$ | $U_\beta$ | angle |
| — | 000 | ... | 0 | 0 | 0 | 0 | 0 | ... |
| 1 | 100 | 000 | $U_{dc}$ | 0 | 0 | 1 | 0 | 0° |
| 2 | 110 | 111 | $U_{dc}$ | $U_{dc}$ | 0 | $\frac{1}{2}$ | $\frac{1}{2}\sqrt{3}$ | 60° |
| 3 | 010 | 000 | 0 | $U_{dc}$ | 0 | $-\frac{1}{2}$ | $\frac{1}{2}\sqrt{3}$ | 120° |
| 4 | 011 | 111 | 0 | $U_{dc}$ | $U_{dc}$ | −1 | 0 | 180° |
| 5 | 001 | 000 | 0 | 0 | $U_{dc}$ | $-\frac{1}{2}$ | $-\frac{1}{2}\sqrt{3}$ | 240° |
| 6 | 101 | 111 | $U_{dc}$ | 0 | $U_{dc}$ | $\frac{1}{2}$ | $-\frac{1}{2}\sqrt{3}$ | 300° |
| — | 111 | ... | $U_{dc}$ | $U_{dc}$ | $U_{dc}$ | 0 | 0 | ... |

The desired terminal voltage $u^*_{Tdq}$ is composed of the across the resistor $R_s$, the voltage across the inductor L, $R_s i$ and jωLi, respectively, as well as the internal emk $u_m$ generated by the motor, which is vectorially represented by jωφ$_m$ in FIG. 3, wherein ω is the angle frequency of the motor flux φ$_m$. It can be seen that the terminal voltage $u^*_{Tdq}$ across the load angle ρ leads the realized motor current $i_{dq}$ in phase.

The vector representation of the desired terminal voltage $u^*_{Tdq}$ can be realized for a frequency convertor 10 by switching to one of the active vectors as shown in FIG. 2.

That is, the terminal voltage $u^*_{Tdq}$ for realizing the desired load current $i^*_{dq}$ can be realized in steps of ±60°.

The theory of switching becomes easier, however, if the integral of the voltage, i.e. the terminal flux $\vec{\Psi}^*_T$, is used instead of the voltage. The voltage delivered by the frequency convertor 10 can now be interpreted as the "direction of the flux". Consequently, a flux path as depicted in FIG. 4 is built up of shorter or longer pieces of the vectors as mentioned in Table 1. It has become apparent that a polygonal track resembling a circle can be realized by means of straight facets $\vec{\Psi}_{\alpha\beta}$ that fit between two concentric circles.

A fairly simple switching rule can be used by switching through +60° when $\vec{\Psi}_{\alpha\beta}$ touches the outer circle, and by switching through −60° when $\vec{\Psi}_{\alpha\beta}$ comes within the inner circle. See also Table 1. If the speed of the terminal flux $\vec{\Psi}^*_T$ becomes too high, the angle of $\vec{\Psi}^*_T$ will lead by too much after some time, and the progression of the flux will have to be stopped. The best choice in that case is to present a zero voltage or to switch to the associated zero vector, as is indicated in Table 1. If the angle of $\vec{\Psi}^*_T$ lags behind too much, a switchback to the last active vector is required. As long as no circle is touched, switching will not be necessary.

Important is that the changes in the motor current $\vec{i}_{\alpha\beta}$ are related very closely to the changes in the flux $\vec{\Psi}^*_T$. After all, the rotor flux of he motor is substantially constant in the rotary coordinate system, i.e. the dq-coordinates, so that the switching rules can also be applied to $\vec{i}_{dq}$. However, there is a difference in direction between the effective current and the effective flux, which is the load angle ρ, as is illustrated in FIG. 3.

The load angle ρ is generally a positive angle when the motor is driven in forward direction, whereas it is a negative angle during braking of the motor, for example, when the supply of energy is reversed. The load angle ρ may have different values, depending on the resistance $R_s$ and different dynamic situations of the motor.

The above switching rules are illustrated in FIG. 5. The switching of the switches in dependence on the flux $\vec{\Psi}_{\alpha\beta}$ touching the concentric boundary circles is translated herein as a switching area or dead zone around the terminal flux $\vec{\Psi}^*_T$, as is indicated by reference numeral 20.

The simple switching rules as referred to above actually correspond to four different actions, viz. switching through +60°, switching through −60°, switching to the preceding active vector or switching to the nearest zero vector, so that the dead zone 20 can be effectively represented as a quadrangular area, in which the crossing of one of the boundary lines 21, 22, 23, 24 of the dead zone 20 by the terminal flux $\vec{\Psi}^*_T$ will initiate a specific switching action. Those skilled in the art will understand that the dimensions of the dead zone 20 are directly related to the allowable deviations in the terminal flux $\vec{\Psi}^*_T$, being equal to the distance between the concentric circles in FIG. 4.

Now let us consider FIG. 6. In the case of a VSI, the voltage $u^*_T$ delivered thereby is affected by the switching of the switches. That is, in the case of a quadrangular dead zone 25, the exceeding of the amplitude deviation limit will take place on the side 26 or on the side 27 of the dead zone 25, as is illustrated in FIG. 6. In the case of a phase event, which leads to the phase deviation limit being exceeded, the phase deviation limit will be exceeded on the side 28 or on the side 29 of the dead zone 25. If the deviation remains within the boundary lines of the dead zone 25, no switching will be required.

When the dead zone 25, which corresponds to the dead zone 20 in FIG. 5, albeit transformed to the quantity to be realized, i.e. the motor current, is according to the invention oriented through the load angle ρ in the direction of the voltage $u^*_T$, the consequence of switching to a zero vector will be, as a result of the application of the switching rules as described above, that the resulting change in the voltage being delivered will be a "perpendicular crossing" from one boundary line 26 of the dead zone 25 to the opposite boundary line 27, as a consequence of which the number of switching actions will be effectively limited and so-called "limit cycles" will be prevented. When the method according to the invention is used, the switching frequency will therefore be lower than with the known frequency convertor control.

As will be understood by those skilled in the art, the voltage delivered by the frequency convertor will exhibit a pulse shape as a result of the switching of the switches. Therefore, the present description refers to effective values of voltage, current and flux.

When a CSI is used as the frequency convertor, the dead zone will be oriented towards the current delivered by the CSI, of course.

Furthermore it will be understood that the dead zone 20 or 25 does not necessarily have to be defined as a quadrangular area. The fact is that the shape of the dead zone is linked to the switching rules that are used, which, in the case of specific loads and specific applications, may differ from the relatively simple rules as described above.

The size of the dead zone, i.e. the dimensions thereof, also determines the switching frequency. In the case of a larger dead zone, switching will generally be required relatively less frequently than in the case of a relatively smaller dead zone, because the boundary lines of the dead zone will be crossed more rapidly in the latter case, which requires a switching action.

The load angle ρ can be determined in various ways, for example from the changes in the load current or the motor current during zero vectors. The load angle may also be determined on the basis of the realized terminal voltage $u^*_T$. Said angle follows from the low-pass filtered values of the voltage components being transformed to the dq-domain.

For small values of the voltage or the current of the frequency convertor, i.e. effective values in the order of the dimensions of the dead zone 25, the calculation of the load angle is insufficiently accurate. By rotating(+180°) the dead zone at a frequency of e.g. a few hundred Hz in the case of such small values, opposed voltage vectors are alternated with zero vectors, so that the required low voltage can be effectively realized. A relatively small dither signal, a triangular dither signal, for example, in the order of 1–2% of the voltage may be applied for rotating the dead zone. As soon as the effective value of the voltage reaches a sufficiently high level, the dither signal may be turned off again, but it may also continue to exist.

The dimensions of the dead zone may furthermore vary in time.

An important aspect of the VSI is the limited voltage that is available, which is set, among others, by the DC voltage 1 at the input of the frequency convertor 10, as shown in FIG. 1. Given a particular load impedance Z, it is theoretically impossible to generate a current having a higher value than $i_{max}=u/Z$, wherein u is the maximum output voltage of the frequency convertor. Since economics play an important role in the design of installations in practice, it is frequently necessary to operate near the system limits. If no special measures are taken, the frequency convertor will not realize any zero vectors as a consequence of a lack of voltage. As a result, the amplitude of the realized current will be smaller, but the angle of the realized current will continue to correspond more or less to the angle of $i^*_{dq}$. This clipping leads to a decrease in the current and thus to a significant reduction of the torque or the driving force of the motor.

According to the invention it is a better strategy to change the phase angle of the current, so that a lower voltage is required for achieving the desired current value. This is schematically shown in FIG. 7.

By rotating the current $i^*_{dq}$ through the angle $\xi$ a lower voltage $u^*_T$ is required for realizing the current value, as a result of which it is possible again to realize the quantity to be realized with a deviation that ranges within the limits of the dead zone in question. The force being developed is proportional to $\cos \xi$.

In practice, the angular displacement can be realized through integration of a signal which is proportional to the duty cycle minus a maximum desired value for the duty cycle, for example 97%. This achieves that the angle $\xi$ will increase for duty cycle values above 97% and that the angle $\xi$ will decrease to minimally 0% again if the duty cycle is smaller than the desired value. It is also possible, of course, to select other methods and to set other percentages in order to achieve this objective.

As will be appreciated from the foregoing, the method according to the invention makes it possible to create zero vectors by suitably orienting the dead zone 20, which leads to a decreased switching frequency of the convertor, which is not possible when using a conventional hysteresis controller, for example, or only by taking more complex measures.

The proposed orientation of the dead zone towards the voltage or current of the frequency convertor by rotating the dead zone through the load angle in the direction of the voltage or current being delivered is not limited to rotation of the dead zone exactly through the load angle $\rho$. Other orientations are possible, depending, among others, on the selected shape of the dead zone and the associated switching rules, it should be noted, however, that a quadrangular shape, in particular a square shape, of the dead zone and rotation through the entire load angle $\rho$ will result in a very simple switching algorithm and produce excellent results.

The method according to the invention can also be used in so-called multi-level frequency convertors, which comprises step-by-step switching of the switches for each level for the purpose of realizing the quantity in question, such as the motor current in the examples as discussed above, with amplitude and phase angle deviations that remain within the limits of the dead zone. The associated switching vector is in turn determined by determining at what level the convertor is operative, as set forth in the foregoing.

FIG. 8 shows a block diagram of an embodiment of a device 30 for carrying out the method according to the invention.

A three-phase motor 32 is connected to the frequency convertor 31, which is of the so-called VSI type. The frequency convertor 31 is fed from a DC source 33. The frequency convertor 31 comprises a plurality of controllable switches, as discussed with reference to the frequency convertor as schematically shown in FIG. 1, and control means 34 for controlling the switches for the purpose of realizing a desired quantity in the motor 32, for example the motor current.

Various sensors or estimators may be used for determining the current angle $\xi$ of the rotary dq-coordinate system with respect to the stationary $\alpha\beta$-coordinate system, as represented by the block 35 and as known to those skilled in the art. From the angle $\xi$ and the realized voltage $u_{\alpha\beta}$ in the fixed coordinate system of the frequency convertor 31, which can be determined from the switching vector which is imposed by the control means 34, the load angle $\rho$ can be determined by rotation through the negative angle $\xi$ and subsequent low-pass filtering of the thus rotated voltage, as is illustrated by the blocks 36, 37 and 38, respectively. The realized value of the motor current is determined by current measurement, for example by means of current transformers 39, 40, 41 and processing means 42, which value is subsequently transformed to the rotary dq-coordinate system via a rotation through $-\xi$. The motor current $i_{dq}$ thus realized is compared with the desired value of the motor current $i^*_{dq}$, for example via summing means 44, and the difference between the realized value and the desired value in the dq-coordinate system $\Delta i_{dq}$ is supplied to a further vector rotator for rotating the deviation or the dead zone through the load angle $\rho$ in accordance with the invention. The dimensions of the dead zone can be set in the block 47 at the input of the control means 34.

Although the various operations, such as low-pass filtering, rotation and the like are represented as separate functional blocks in the embodiment of the invention, said functions may be carried out by suitably programmed digital processor means, such as a microprocessor $\mu$P, or in whole or in part by means of analog components, including devices such as an FPGA, for example, as may the control of the switches of the frequency convertor 31, as represented by the control means 34.

A control program and a data carrier, such as a CD-ROM, a floppy disk or the like provided with a control program form part of the present invention.

It will be understood that the invention is not limited to the use thereof with electrical loads in the form of electric motors, such as synchronous motors or induction motors, but that the invention may also be used for realizing a desired quantity in other types of electrical loads, such as transformers and load resistors having a high-frequency impedance greater than zero.

The device and the method according to the invention are in particular suitable for controlling linear electric motors, such as linear synchronous motors or linear induction motors, in which the motor parameters are not constant. It is not necessary to know the momentary motor parameters, such as the inductance, for implementing and designing the method.

What is claimed is:

1. A method for realizing an effective value of a quantity to be varied in an electrical load connected to a multi-phase switchable DC/AC frequency convertor comprising a plurality of controllable switches, wherein said value is realized by varying a current or a voltage delivered by the DC/AC frequency convertor through suitable switching of the switches thereof, and wherein said quantity exhibits a load angle which, averaged in time, leads or lags the voltage or current being delivered, which method comprises the steps of:

defining a dead zone having dimensions representative of an allowable amplitude and phase angle deviation in the quantity to be realized;

orienting the dead zone with respect to the voltage or current delivered by the DC/AC frequency convertor by rotating the dead zone through the load angle in the direction of the delivered voltage or current; and switching at least one of the switches on the basis of the manner in which the deviation in the quantity to be realized extends beyond the dead zone, for the purpose of realizing said quantity during operation with an amplitude and phase angle deviation ranging within the dead zone.

2. A method according to claim 1 wherein the dead zone is quadrangular in shape, and having opposing first and second boundary lines and opposing third and fourth boundary lines.

3. A method according to claim 2 wherein the dead zone is oriented in such a manner that when the deviation in the quantity to be realized crosses the opposing first and second boundary lines from within the dead zone, the switches of the frequency convertor are switched in such a manner that the phase angle of the voltage or current being delivered is increased or decreased, respectively, and that when the deviation in the quantity to be realized crosses the opposing third and fourth boundary lines from within the dead zone, the switches of the frequency convertor are switched in such a manner that the amplitude of the voltage or current being delivered is increased or decreased, respectively.

4. A method according to claim 1, wherein the dead zone is periodically rotated through 180degrees in alternate directions in the case of a relatively small amplitude, in the order of the dimensions of the dead zone, of the effective value of the voltage or current being delivered by the frequency convertor.

5. A method according to claim 1, wherein, in the situation in which the deviation in the quantity to be realized can no longer be kept within limits of the dead zone due to the switching of the switches of the frequency convertor, the phase angle of the quantity to be realized is separately controlled, in such a manner that the deviation is reduced to a value within the dead zone again.

6. A method according to claim 1, wherein, in the case of a multi-level switchable DC/AC frequency convertor having several control levels, the switches of the frequency convertor are switched step-by-step for each level for the purpose of realizing said quantity with amplitude and phase angle deviations that remain within limits of the dead zone.

7. A method according to claim 1, wherein said load is an AC electric motor and wherein the quantity to be realized is the motor current.

8. A method according to claim 7, wherein the electric motor is a linear motor.

9. A method according to claim 1, wherein said load is an AC electric motor and wherein the quantity to be realized is magnetic flux generated in the motor.

10. A method according to claim 9, wherein the electric motor is a linear motor.

11. A control program stored on a data carrier that can be read by digital or analog processor means and arranged for carrying out the method according to claim 1.

12. A data carrier comprising a control program according to claim 11.

13. A device for realizing an effective value of a quantity to be varied in an electrical load connected to a multi-phase switchable DC/AC frequency convertor comprising a plurality of controllable switches, control means for realizing said value by varying a current or a voltage delivered by the DC/AC frequency convertor through suitable switching of the switches thereof, and means for determining a load angle through which said quantity, averaged in time, leads or lags the voltage or current being delivered, wherein the control means are arranged for:

defining a dead zone having dimensions representative of an allowable amplitude and phase angle deviation in the quantity to be realized;

orienting the dead zone with respect to the voltage or current delivered by the DC/AC frequency convertor by rotating the dead zone through the load angle in the direction of the delivered voltage or current; and switching at least one of the switches on the basis of the manner in which the deviation in the quantity to be realized extends beyond the dead zone, for the purpose of realizing said quantity during operation with an amplitude and phase angle deviation ranging within the dead zone.

14. A device according to claim 10, wherein said control means is arranged for defining a dead zone which is quadrangular in shape, and having opposing first and second boundary lines and opposing third and fourth boundary lines.

15. A device according to claim 14, wherein said control means is arranged for orienting the dead zone with respect to the voltage or current delivered by the frequency convertor, in such a manner that when the deviation in the quantity to be realized crosses the opposing first and second boundary lines from within the dead zone, the switches of the frequency convertor are switched in such a manner that the phase angle of the voltage or current being delivered is increased or decreased, respectively, and that when the deviation in the quantity to be realized crosses the opposing third and fourth boundary lines from within the dead zone, the switches of the frequency convertor are switched in such a manner that the amplitude of the voltage or current being delivered is increased or decreased, respectively.

16. A device according to claim 13, wherein the control means is arranged for periodically rotating the dead zone through 180degrees in alternate directions in the case of a relatively small amplitude, in the order of the dimensions of the dead zone, of the effective value of the voltage or current being delivered by the frequency convertor.

17. A device according to claim 10, wherein said control means is arranged for separately controlling the phase angle of the quantity to be realized, in the situation in which the deviation in the quantity to be realized can no longer be kept within the limits of the dead zone due to the switching of the switches of the frequency convertor, in such a manner that the deviation is reduced to a value within the dead zone again.

18. A device according to claim 13, wherein the plurality of switches of the frequency convertor are arranged for switching with different control levels, wherein the control means is arranged for switching the switches of the frequency convertor step-by-step for each level for the purpose of realizing said quantity with amplitude and phase angle deviations that remain within the limits of the dead zone.

19. A device according to claim 13, wherein the load is an AC electric motor.

20. A device according to claim 19, wherein the electric motor is a linear motor.

21. A device according to claim 13, wherein said control means comprise processor means.

* * * * *